(12) United States Patent
Kadota

(10) Patent No.: US 8,542,400 B2
(45) Date of Patent: Sep. 24, 2013

(54) PRINTING SYSTEM

(75) Inventor: Masatoshi Kadota, Takahama (JP)

(73) Assignee: Brother Kogy Kabushiki Kaisha, Nagoya-shi (JP)

( * ) Notice: Subject to any disclaimer, the term of this patent is extended or adjusted under 35 U.S.C. 154(b) by 1398 days.

(21) Appl. No.: 11/966,178

(22) Filed: Dec. 28, 2007

(65) Prior Publication Data

US 2008/0158578 A1 Jul. 3, 2008

(30) Foreign Application Priority Data

Dec. 28, 2006 (JP) ................................ 2006-354146

(51) Int. Cl.
 *G06F 15/00* (2006.01)
(52) U.S. Cl.
 USPC ........... 358/1.9; 358/2.1; 358/3.24; 358/3.28; 382/100
(58) Field of Classification Search
 USPC ...................................................... 358/1.14
 See application file for complete search history.

(56) References Cited

U.S. PATENT DOCUMENTS

| | | | |
|---|---|---|---|
| 7,465,008 B2 | 12/2008 | Nunokawa et al. | |
| 2002/0178362 A1* | 11/2002 | Kwon | 713/176 |
| 2005/0058476 A1* | 3/2005 | Murakami | 399/366 |
| 2006/0140699 A1* | 6/2006 | Uchida et al. | 400/62 |
| 2006/0147236 A1* | 7/2006 | Uchida et al. | 400/62 |
| 2007/0147657 A1* | 6/2007 | Sato | 382/100 |

FOREIGN PATENT DOCUMENTS

| | | |
|---|---|---|
| JP | 1-170957 A | 7/1989 |
| JP | 06-064248 | 3/1994 |
| JP | 2005-149219 | 6/2005 |
| JP | 2005-335138 A | 12/2005 |
| JP | 2006-276057 A | 10/2006 |
| JP | 2006-277080 A | 10/2006 |

OTHER PUBLICATIONS

JP Office Action dtd Nov. 11, 2008, JP Appln. 2006-354146.

* cited by examiner

Primary Examiner — Benjamin O Dulaney
(74) Attorney, Agent, or Firm — Banner & Witcoff, Ltd.

(57) ABSTRACT

A printing system includes a printing unit and a print controlling unit. The printing unit is configured to print a primary image and a secondary image on a recording medium and that is capable of switching between a multicolor printing mode and a monochrome printing mode. The print controlling unit includes a determining unit and a color restricting unit. The determining unit determines whether the secondary image has an attribute indicating the monochrome printing mode. The color restricting unit controls the printing unit to print the primary image and the secondary image in the monochrome printing mode if the determining unit determines that the secondary image has the attribute indicating the monochrome printing mode.

16 Claims, 9 Drawing Sheets

FIG.2

| ID | TITLE | Text/Bitmap | CHARACTER STRING/ ADDRESS OF WATERMARK | POSITION | ANGLE | FONT | ... | GROUP INFORMATION |
|---|---|---|---|---|---|---|---|---|
| 0 | (NO WATERMARK) | | | | | | | |
| 1 | CONFIDENTIAL | TEXT | CONFIDENTIAL | 0,0 | 30 | Arial | ... | Built-In |
| 2 | COPY | TEXT | COPY | 0,0 | 30 | Arial | ... | Built-In + COPY |
| 3 | DRAFT | TEXT | DRAFT | 0,0 | 30 | Arial | ... | Built-In + DRAFT |

FIG.9

| ID | TITLE | Text/Bitmap | CHARACTER STRING/ADDRESS OF WATERMARK | POSITION | ANGLE | FONT | ... | GROUP INFORMATION |
|---|---|---|---|---|---|---|---|---|
| 0 | (NO WATERMARK) | | | | | | | |
| 1 | CONFIDENTIAL | TEXT | CONFIDENTIAL | 0,0 | 30 | Arial | ... | Built-In |
| 2 | COPY | TEXT | COPY | 0,0 | 30 | Arial | ... | Built-In + COPY |
| 3 | DRAFT | TEXT | DRAFT | 0,0 | 30 | Arial | ... | Built-In + DRAFT |
| 4 | COPY2 | TEXT | Copy | 0,0 | 45 | Arial | ... | COPY |
| 5 | COPY3 | BITMAP | c:¥WM¥copy3.bmp | 100,150 | - | - | ... | COPY |

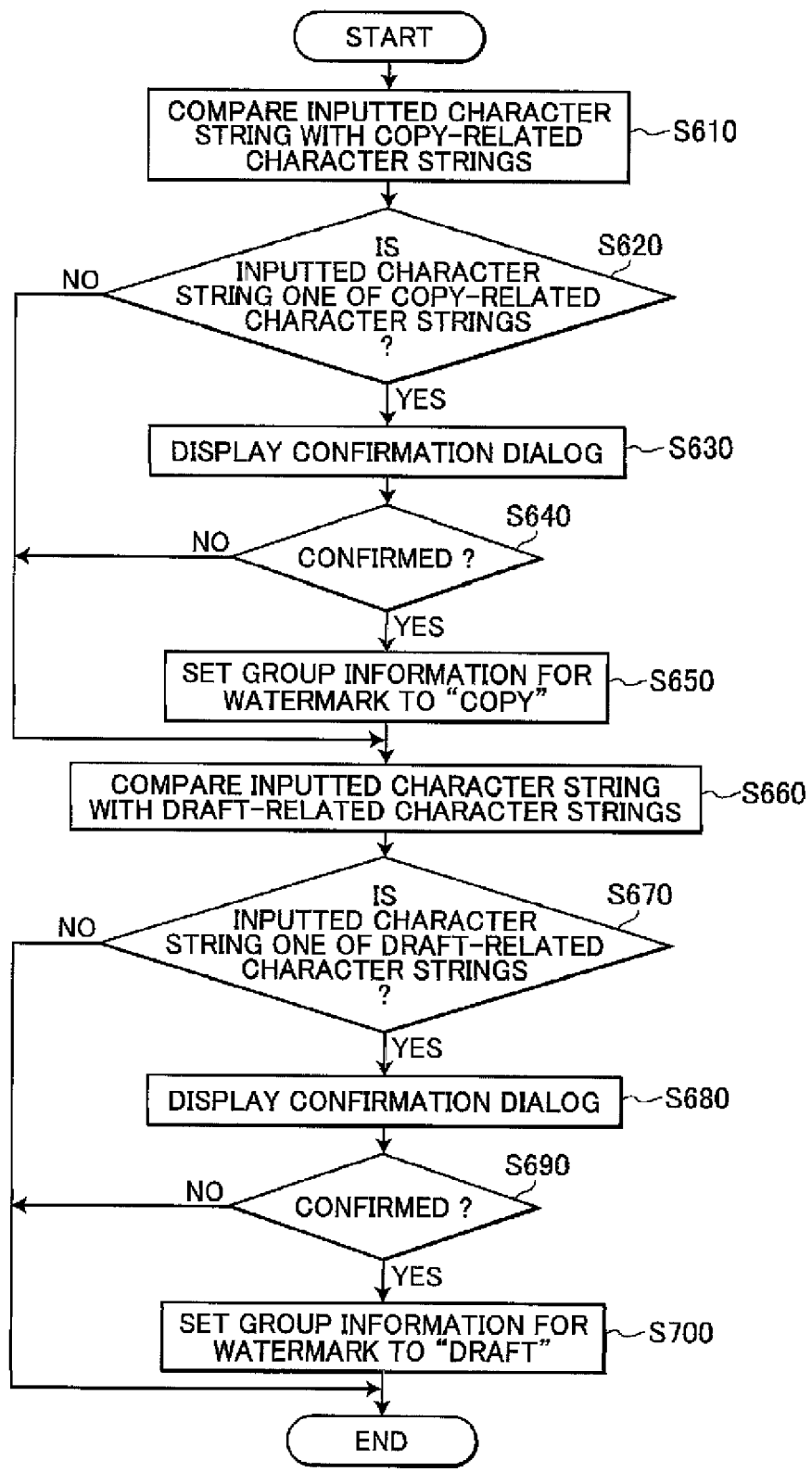

PRINTING SYSTEM

CROSS REFERENCE TO RELATED APPLICATION

The present application claims priority from Japanese patent application No. 2006-354146, which was filed on Dec. 28, 2006, the disclosure of which is herein incorporated by reference in its entirety.

TECHNICAL FIELD

The present invention relates to a printing system capable of switching between a color printing mode and a monochrome printing mode and having a printing unit for printing images on a recording medium, and a print controlling unit for controlling the printing unit. The present invention also relates to a printing controller, a print controlling method, and a storage medium for storing a print controlling program.

BACKGROUND

In the invention disclosed in Japanese Patent Application Publication No. H06-64248, for example, the printing system switches the printing mode of the printing unit between a color printing mode and a monochrome printing mode. Specifically, the printing system prints one copy (an original) in color and prints the remaining copies (duplicates) in monochrome (i.e., restricts color printing).

Normally in color printing, an image is formed based on image data by superimposing toner or ink in the four colors cyan, magenta, yellow, and black on a recording medium. In monochrome printing, the image is formed based on the image data by applying toner or ink of the single color black on the recording medium. Since there is generally no need to superimpose toner or ink in the monochrome printing, the black toner or ink being applied in one layer on the recording medium, the monochrome printing is less expensive than color printing.

SUMMARY

However, since the invention disclosed in Japanese Patent Application Publication No. H06-64248 prints all but one copy of the plurality of copies in monochrome, this printing system is not suitable for cases in which the user wishes to print all copies in color, or cases in which only one copy is to be printed and there is no particular need to print in color. Hence, the invention cannot effectively restrict color printing.

Therefore, it is an object of the present invention to provide a printing system, printing controller, print controlling method and a storage medium for storing a print controlling program that are capable of effectively restricting color printing.

In order to attain the above and other objects, the invention provides a printing system includes a printing unit and a print controlling unit. The printing unit is configured to print a primary image and a secondary image on a recording medium and that is capable of switching between a multicolor printing mode and a monochrome printing mode. The print controlling unit includes a determining unit and a color restricting unit. The determining unit determines whether the secondary image has an attribute indicating the monochrome printing mode. The color restricting unit controls the printing unit to print the primary image and the secondary image in the monochrome printing mode if the determining unit determines that the secondary image has the attribute indicating the monochrome printing mode.

According to another aspect, the invention also provides a storage medium storing a print controlling program for instructing a printing system including a printing unit capable of printing a primary image and a secondary image on a recording medium and switching between a color printing mode and a monochrome printing mode. Instructions of the print controlling program includes:

determining whether the secondary image has an attribute indicating the monochrome printing mode; and controlling the printing unit to print the primary image and the secondary image in the monochrome printing mode if it is determined by the determining instructions that the secondary image has the attribute indicating the monochrome printing mode.

According to another aspect, the invention also provides a print controlling method for a printing system including a printing unit capable of printing a primary image and a secondary image on a recording medium and switching between a color printing mode and a monochrome printing mode. The print controlling method includes:

determining whether the secondary image has an attribute indicating the monochrome printing mode; and controlling the printing unit to print the primary image and the secondary image in the monochrome printing mode if the determining step determines that the secondary image has the attribute indicating the monochrome printing mode.

BRIEF DESCRIPTION OF THE DRAWINGS

In the drawings:

FIG. 2 is an explanatory diagram showing a list of watermarks stored on a hard disk drive of a PC in the printing system according to the embodiment;

FIG. 9 is an explanatory diagram showing a watermark table newly recorded by the user in the printing system according to the embodiment; and FIG. 10 is a flowchart illustrating steps in a control process executed on the printing system according to a second embodiment of the present invention when a character string is inputted into a character string input part in the watermark setting dialog box.

DETAILED DESCRIPTION

Next, present embodiments of the present invention will be described while referring to the accompanying drawings. In the example of the present embodiments, a computer and a printer connected to the computer function as a printing system by installing a print controlling program according to the present invention on the computer. Further, this printing system is shared by a plurality of users.

(First Embodiment)

1. Overview of the Printing System

Figure 1:
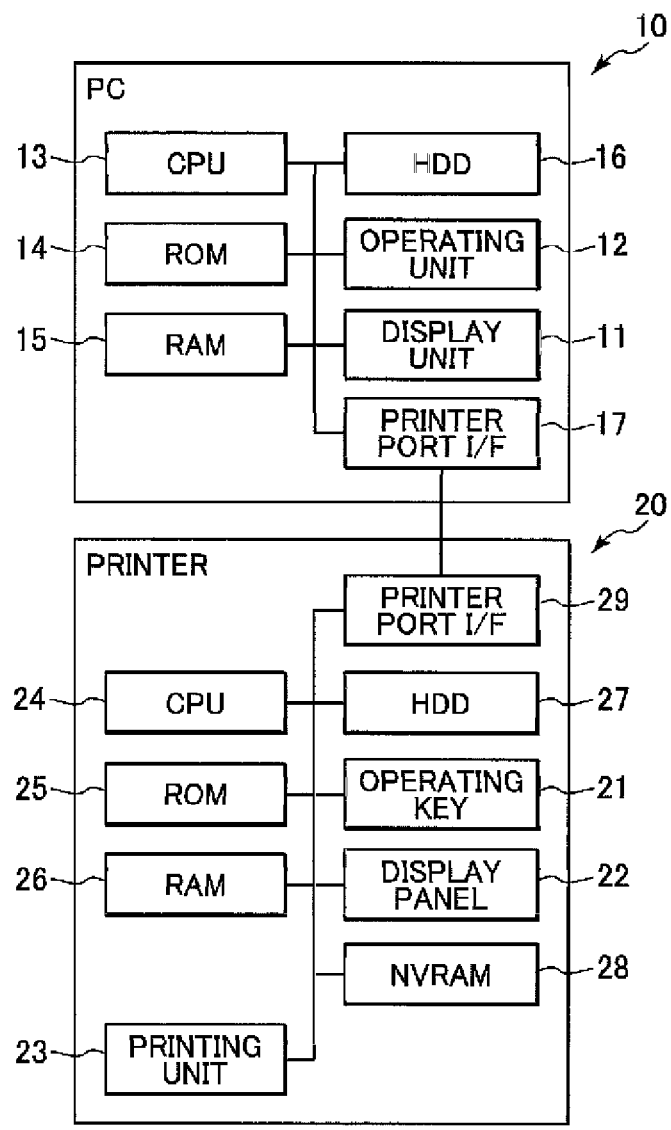
FIG. 1 is a block diagram showing a printing system according to an embodiment of the present invention.

FIG. 1 is a block diagram showing the overall structure of a printing system according to a first embodiment. The printing system includes a computer 10, a printer 20, and the like. In the following description, the computer 10 will be referred to as a "PC 10."

As shown in FIG. 1, the PC 10 includes a display unit 11, an operating unit 12, a CPU 1S, a ROM 14, a RAM 15, a hard disk drive (HDD) 16, and a printer port interface 17. The display unit 11 displays text and images and is configured of a liquid crystal display panel, CRT (Braun tube) display, or the like. The operating unit 12 including a mouse (not shown) for moving a pointer (not shown) on the display unit 11 to specify different areas thereof, and a keyboard (not shown). The printer port interface 17 connects the PC 10 to the printer 20.

The PC 10 determines whether the user of the printer 20 is a specific user (hereinafter referred to as "administrator") based on a login name and password the user inputs when logging into the PC 10.

The printer 20 according to the present embodiment is capable of switching between a color printing mode and a monochrome printing mode. As shown in FIG. 1, the printer 20 includes operating keys 21, a display panel 22, a printing unit 23, a CPU 24, a ROM 25, a RAM 26, a hard disk drive (HDD) 27, a NVRAM 28, and a printer port interface 29. The operating keys 21 is used for selecting functions of the printer 20 and the like. The display panel 22 displays operating instructions and the operating status. The printing unit 23 prints text, images, and the like on paper or another recording medium. The NVRAM 28 is capable of preserving stored content when the power supply is shut off. The printer port interface 29 directly connects the printer 20 to the PC 10.

The printing unit 23 is configured to transfer and fix toner in the four colors cyan, magenta, yellow, and black, for example, on a recording medium. In the color printing mode, the printing unit 23 outputs colors corresponding to image data by superimposing toner of these colors in multiple layers. In the monochrome printing mode, on the other hand, the printing unit 23 transfers and fixes a single layer of black toner on the recording medium. Further the printing unit 23 is not restricted to toner, but may print using ink instead.

2. Color Restriction Printing Function

The printing unit 23 of the PC 10 prints images in the monochrome printing mode, even when the images are configured of color data, if a watermark having an attribute indicating the monochrome printing mode (hereinafter referred to as a color restriction attribute) is added to the image data. This function is referred to as a color restriction printing function.

Specifically, the color restriction printing function forces the printer 20 as a rule to execute a printing operation in the monochrome printing mode, regardless of the current printing mode, for an input image (image data) including a watermark with the color restriction attribute.

In the present embodiment, only the administrator can modify settings for the color restriction printing function. These settings include whether to implement the color restriction printing function, and the setting of the color restriction attribute. Hence, in this embodiment, users other than the administrator cannot modify settings for the color restriction printing function.

The color restriction printing function can be modified in a color restriction setup dialog box 70 (see FIG. 4) displayed on the display unit 11 after the administrator selects (clicks) a color restriction setup button 42 (see FIG. 3A) in a printing setup window 30 (see FIG. 3) described later.

3. Watermarks

Watermarks in the present embodiment are superimposed over and printed transparently with the image to be printed. A plurality (three in the present embodiment) of standard watermarks is stored on the HDD 16 of the PC 10.

As shown in a watermark table of FIG. 2, watermarks stored in the HDD 16 include a watermark configured of the character string "CONFIDENTIAL," a watermark configured of the character string "COPY," and a watermark configured of the character string "DRAFT."

As shown in FIG. 2, these three watermarks are stored in the HDD 16 in association with an identification number (ID), a title, a saving format, a display position on the recording paper, an inclination angler a font, group information, and the like.

The group information mentioned above is an identifier for sorting the watermarks into groups. Examples of the group information are "copy" indicative of a group to which the watermarks signifying "copy" belong, and "draft" indicative of another group to which the watermarks signifying "draft" belong. The three watermarks described above all belong to the group "Built-In" indicating watermarks prestored by the manufacturer.

4. Description of the Printing Setup Window

In the present embodiment, by operating the operating unit 12 to input a printing setup command for a printing operation, the user can display the printing setup window 30 shown in FIGS. 3A and 3B on the display unit 11 based on a program described later.

Figure 3A:
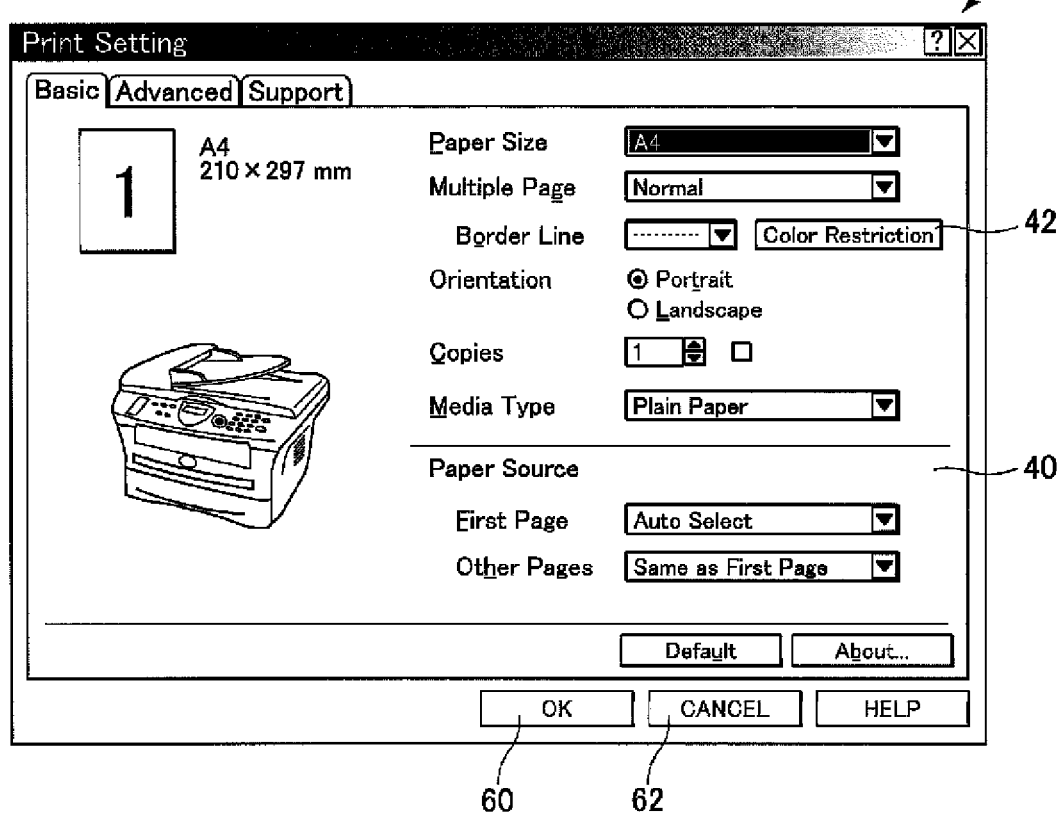
FIGS. 3A and 3B is an explanatory diagram showing a printing setup window for the printing system of the embodiment.
Figure 3B:
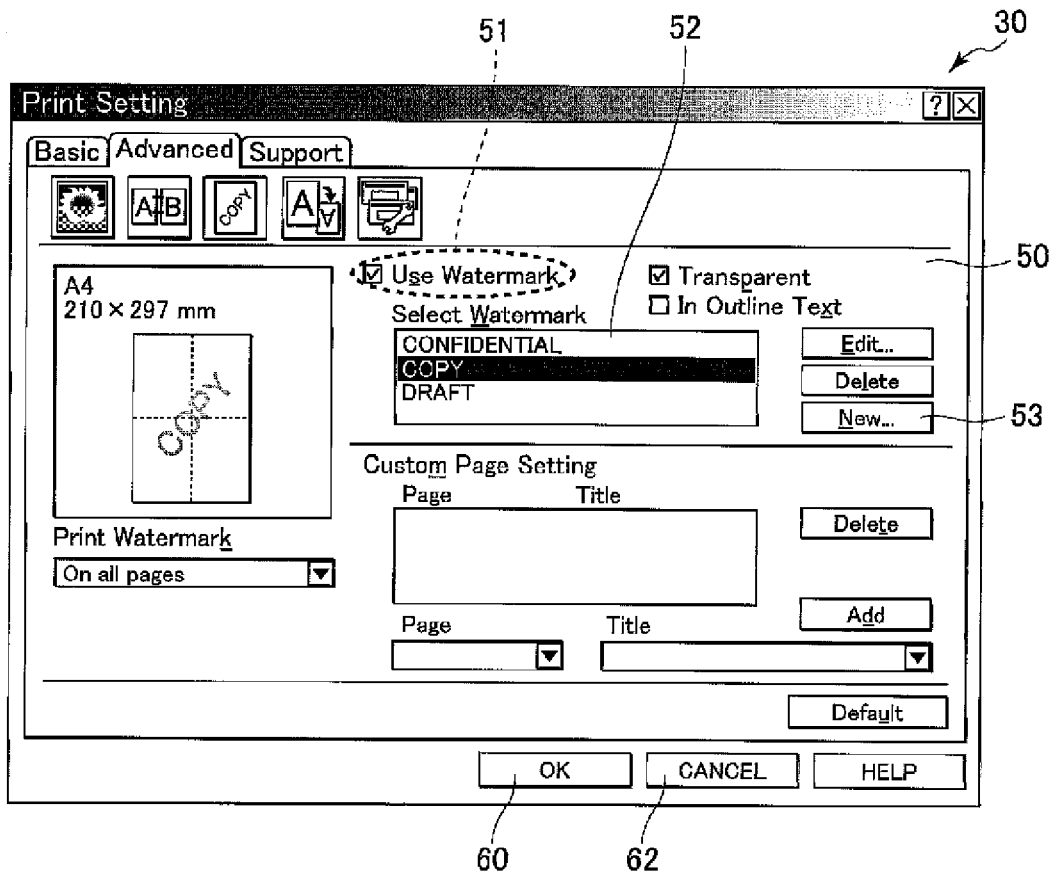

The printing setup window 30 includes a basic setup window 40 shown in FIG. 3A, an expanded function setup window 50 shown in FIG. 3B, a support window (not shown), an OK button 60, and a Cancel button 62. The basic setup window 40 is capable of inputting basic settings related to printing, including settings for the size (dimensions) of the recording paper, the number of copies, and the color restriction printing function. The expanded function setup window 50 is capable of setting the resolution of the printed image, the watermark, and the like. The expanded function setup window 50 also includes a Use Watermark selecting part 51, a watermark selection window 52, and a watermark setting button 53. A watermark is attached to and printed with an image only when the Use Watermark selecting part 51 is checked. If the Use Watermark selecting part 51 is not checked, the watermark selection window 52 is displayed in grayout (disabled). When the Use Watermark selecting part 51 is checked, all watermarks recorded in the HDD 16 are displayed in the watermark selection window 52, enabling the user to select a desired watermark. The watermark setting button 53 allows the user to register a new watermark.

When the OK button 60 is selected (clicked) in the printing setup window 30 in the present embodiment, an image is printed based on the contents in the basic setup window 40 and expanded function setup window 50, i.e., the contents set in the printing setup window 30. The set contents are temporarily stored in the RAM 15.

By operating the operating unit 12, the user can selectively switch the display window among the basic setup window 40, expanded function setup window 50, and the support window in the printing setup window 30.

The basic setup window 40 also includes the color restriction setup button 42 for modifying settings in the color restriction printing function. By selecting (clicking) the color restriction setup button 42, the user can display the color restriction setup dialog box 70 shown in FIG. 4.

Figure 4:
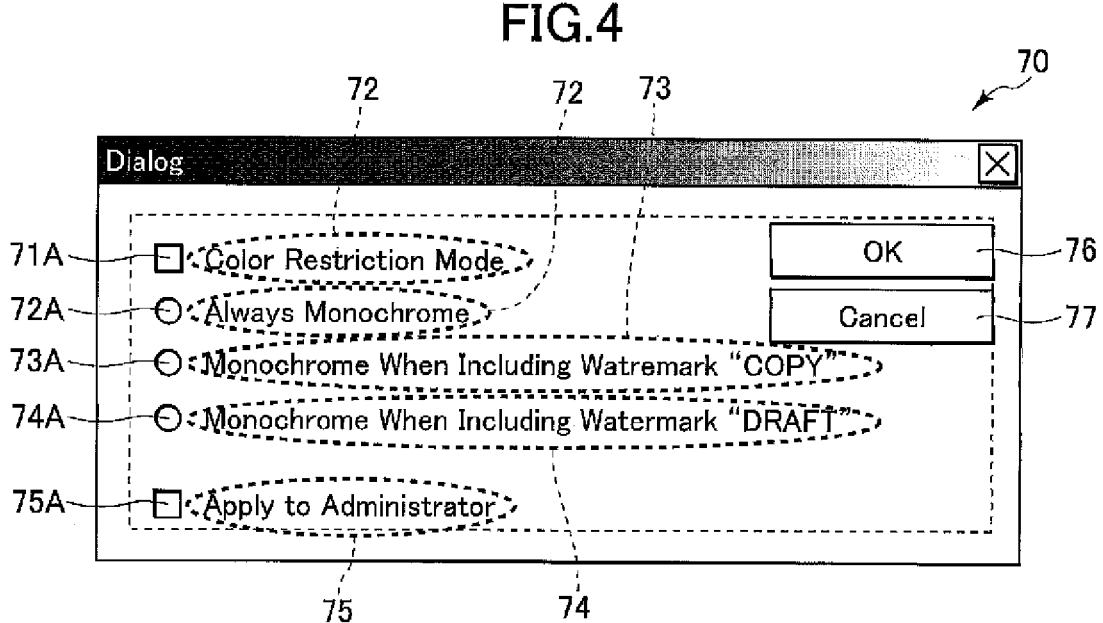
FIG. 4 is an explanatory diagram showing a color restriction setup dialog box in the printing system according to the embodiment.

As shown in FIG. 4, the color restriction setup dialog box 70 allows the administrator to set contents of the color restriction printing function, including whether to execute the color restriction printing function and the setting of the color restriction attribute. Users other than the administrator are only allowed to view the color restriction setup dialog box 70.

In the color restriction setup dialog box 70, the administrator can set (select) whether to execute the monochrome printing for all images, regardless of the existence of a watermark, or whether to execute the monochrome printing for images with watermarks having the color restriction attribute.

When executing the monochrome printing for images with the watermark being relevant to the color restriction attributer the watermark being relevant to the group information "copy" and configured of the character string "COPY", or the watermark being relevant to the group information "draft" and configured of the character string "DRAFT" can be set as the watermarks having the color restriction attribute based on the settings shown in FIG. 2.

More specifically, the administrator can select in the color restriction setup dialog box 70 whether to apply the color restriction printing function to users other than the administrator or whether to apply the color restriction printing function to all users including the administrator.

Next, the color restriction setup dialog box 70 having the above configuration will be described in greater detail. The color restriction setup dialog box 70 is configured of seven input objects (selections), including Color Restriction Mode 71, Always Monochrome 72, Monochrome When Including Watermark "COPY" 73, Monochrome When Including Watermark "DRAFT" 74, Apply to Administrator 75, an OK button 76, and a Cancel button 77.

Of the input objects 71-77, the Color Restriction Mode 71 functions to indicate whether to execute the color restriction printing function. Each time the administrator selects (clicks) a checkbox 71A provided to the left of the Color Restriction Mode 71, a mark (check) is toggled on or off in the checkbox 71A.

The color restriction printing function is implemented when the check is displayed in the checkbox 71A. The Always Monochrome 72, Monochrome When Including Watermark "COPY" 73, and Monochrome When Including Watermark "DRAFT" 74 function to select the color restriction attribute. The administrator can select a checkbox 72A to the left of the Always Monochrome 72 to toggle the mark in the checkbox 72A on or off.

Each time the checkbox 72A is clicked, the mark (black circle) is toggled on and off in the checkbox 72A. All images are printed in the monochrome printing mode when the mark is displayed in the checkbox 72A.

A checkbox 73A provided to the left of the Monochrome When Including Watermark "COPY" 73 can be selected when the checkbox 71A of the color restriction setup dialog box 70 is checked and when the checkbox 72A of the Always Monochrome 72 is not checked.

Each time the administrator clicks the checkbox 73A of the Monochrome When Including Watermark "COPY" 73, a mark (black circle) is toggled on and off in the checkbox 73A. Images having the watermark configured of the character string "COPY" are printed in the monochrome printing mode when the checkbox 73A has been checked.

A checkbox 74A provided to the left of the Monochrome When Including Watermark "DRAFT" 74 can be selected when the checkbox 71A is checked and the checkbox 72A is not checked.

Each time the administrator clicks the checkbox 74A of the Monochrome When Including Watermark "DRAFT" 74, a mark (black circle) is toggled on and off in the checkbox 74A. Images having the watermark configured of the character string "DRAFT" are printed in the monochrome printing mode when the checkbox 74A has been checked.

Hence, if either the checkbox 73A of the Monochrome When Including Watermark "COPY" 73 or the checkbox 74A of the Monochrome When Including Watermark "DRAFT" 74 has been checked in the present embodiments watermarks being relevant to the group information corresponding to the checked item in the color restriction setup dialog box 70 become watermarks having the color restriction attribute.

The Apply to Administrator 75 functions to apply the color restriction printing function to all users including administrators. Each time a checkbox 75A provided to the left of the Apply to Administrator 75 is selected (clicked), a mark (check) is toggled on and off in the checkbox 75A.

While the checkbox 75A is checked, the color restriction printing function is applied to all users including the administrator. However, the color restriction printing function is only applied to users other than administrator when the checkbox 75A is not checked.

The contents Vindication of being checked or not) checked in the checkboxes 71A-75A next to the input objects 71-75 is stored in the HDD 16 when the administrator selects (clicks) the OK button 76 in the color restriction setup dialog box 70. These contents are reflected in the color restriction setup dialog box 70 whenever the color restriction setup dialog box 70 is displayed.

When a user other than the administrator displays the color restriction setup dialog box 70, only the OK button 76 and Cancel button 77 are enabled, while the input objects 71-75 are disabled (cannot be selected), thereby preventing the user other than the administrator from configuring the color restriction printing function. In the present embodiment, the input objects 71-75 are displayed in grayout, indicating that the user cannot select these objects.

Figure 5:
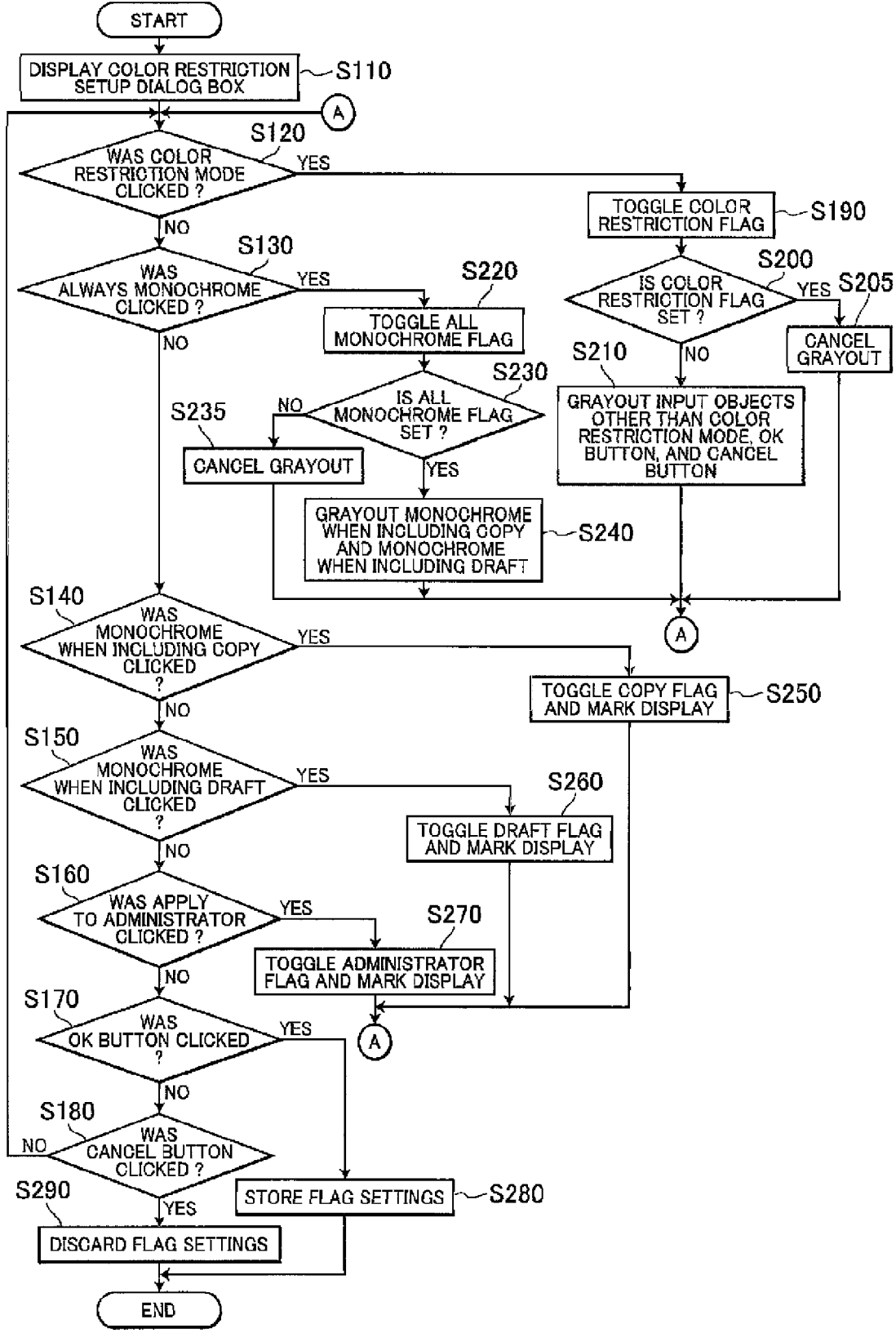
FIG. 5 is a flowchart illustrating steps for a process for setting a color restriction printing function in the printing system according to the embodiment.

5. Featured Operations of the Print Controlling Program 5.1. Process for Setting the Color Restriction Printing Function Next, the operations based on a program enabling the user to configure the color restriction printing function (process for configuring the color restriction printing function) on the PC 10 according to the present embodiment will be described. FIG. 5 is a flowchart illustrating steps in the process for configuring the color restriction printing function.

The process for configuring the color restriction printing function shown in FIG. 5 is executed by the PC 10 when the administrator using the PC 10 selects (clicks) the color restriction setup button 42 (see FIG. 3A). In S110 at the beginning of the process, the CPU 13 of the PC 10 displays the color restriction setup dialog box 70 shown in FIG. 4.

After displaying the color restriction setup dialog box 70 in S110, the CPU 13 repeatedly executes the process in S120-S180 until one of the input objects 71-77 in the color restriction setup dialog box 70 has been selected.

Specifically, the CPU 13 determines in S120 whether the checkbox 71A of the Color Restriction Mode 71 has been clicked, determines in S130 whether the checkbox 72A of the Always Monochrome 72 has been clicked, and determines in S140 whether the checkbox 73A of the Monochrome When Including Watermark "COPY" 73 has been clicked.

Further, the CPU 13 determines in S150 whether the checkbox 74A of the Monochrome When Including Watermark "DRAFT" 74 has been clicked, determines in S160 whether the checkbox 75A of the Apply to Administrator 75 has been clicked, determines in S170 whether the OK button 76 has been clicked, and determines in S180 whether the Cancel button 77 has been clicked.

If the CPU 13 determines that the checkbox 71A of the Color Restriction Mode 71 has been clicked (S120: YES), then in S190 the CPU 13 toggles the display of the mark in the checkbox 71A and reverses a setting for a color restriction flag indicating whether to implement the color restriction printing function.

In other words, if the mark in the checkbox 71A of the Color Restriction Mode 71 is currently displayed, then in S190 the CPU 13 cancels the display and resets the color restriction flag. On the other hand, if the checkbox 71A is not checked, then the CPU 13 displays the check in the checkbox 71A and sets the color restriction flag.

After toggling the display in the checkbox 71A and reversing the setting for the color restriction flag in S190, the CPU 13 determines in S200 whether the color restriction flag is now set.

If the color restriction flag is now set (S200: YES), then in S205 the CPU 13 cancels the grayout (disabled state) for all input objects other than the Color Restriction Mode 71, OK button 76, and Cancel button 77. Subsequently, the CPU 13 again repeatedly executes the process in S120-S180 until one of the input objects 71-77 has been clicked.

However, it the CPU 13 determines in S200 that the color restriction flag is not set (S200: NO), then in S210 the CPU 13 grays out (disables) the display for all input objects other than the Color Restriction Mode 71, OK button 76, and Cancel button 77.

After disabling these input objects in S210, the CPU 13 again repeatedly executes the process in S120-S180 in order to detect whether an input object other than the input objects grayed out in S210 has been clicked. If the checkbox 71A of the Color Restriction Mode 71 is subsequently clicked (S120: YES), so that the color restriction flag is once again set (S200: YES), then the grayed out display is canceled.

If the CPU 13 determines in S120 that the checkbox 71A of the Color Restriction Mode 71 has not been clicked (S120: NO), then the CPU 13 determines in S130 whether the checkbox 72A of the Always Monochrome 72 has been clicked. If the CPU 13 determines that the checkbox 72A has been clicked (S130: YES), then in S220 the CPU 13 toggles the display of the mark in the checkbox 72A and reverses a setting of an all monochrome flag indicating that monochrome printing is to be performed for all images.

Specifically, if the mark is already displayed in the checkbox 72A of the Always Monochrome 72, then in S220 the CPU 13 cancels this display and resets the all monochrome flag. On the other hand, if the checkbox 72A is not checked, then the CPU 13 displays the mark in the checkbox 72A and sets the all monochrome flag.

After toggling the display in the checkbox 72A and reversing the setting of the all monochrome flag in S220, the CPU 13 determines in S230 whether the all monochrome flag is now set.

If the all monochrome flag is not currently set (S230: NO), then in S235 the CPU 13 cancels the grayout (disabled state) of the Monochrome When Including Watermark "COPY" 73 and Monochrome When Including Watermark "DRAFT" 74, and subsequently repeatedly executes the process in S120-S180 until one of the input objects 71-77 has been clicked.

However, if the all monochrome flag is currently set (S230: YES), then in S240 the CPU 13 grays out (disables) the displays of the Monochrome When Including Watermark "COPY" 73 and Monochrome When Including Watermark "DRAFT" 74, and subsequently repeatedly executes the process in S120-S180 to detect whether an input object other than the input objects 73 and 74 grayed out in S240 has been clicked.

Further, if the CPU 13 determines in S130 that the checkbox 72A of the Always Monochrome 72 has not been clicked (S130: NO), then the CPU 13 determines in S140 whether the checkbox 73A of the Monochrome When Including Watermark "COPY" 73 has been clicked.

If the checkbox 73A has been clicked (S140: YES), then in S250 the CPU 13 toggles the display of the mark in the checkbox 73A of the Monochrome When Including Watermark "COPY" 73 and reverses a copy flag indicating that watermarks being relevant to the group information "COPY" has the color restriction attribute.

Specifically, when the mark is displayed in the checkbox 73A of the Monochrome When Including Watermark "COPY" 73, in S520 the CPU 13 cancels this display and resets the copy flag. On the other hand, if the mark is not displayed in the checkbox 73A, then the CPU 13 displays the mark in the checkbox 73A and sets the copy flag. Accordingly, the CPU 13 references a state of the copy flag when determining whether a watermark (COPY) attached to an image has the color restriction attribute.

After toggling the display of the mark in the checkbox 73A and reversing a setting of the copy flag in S250, the CPU 13 again repeatedly executes the process in S120-S180 until one of the input objects 71-77 has been clicked.

Further, if the CPU 13 determines that the checkbox 73A of the Monochrome When Including Watermark "COPY" 73 was not clicked (S140: NO), then the CPU 13 determines in S150 whether the checkbox 74A of the Monochrome When Including Watermark "DRAFT" 74 was clicked.

If the checkbox 74A of the Monochrome When Including Watermark "DRAFT" 74 was clicked (S150: YES), then in S260 the CPU 13 toggles the display of the mark in the checkbox 74A and reverses a setting for a draft flag indicating whether a watermark being relevant to the group information "DRAFT" has the color restriction attribute.

Specifically, if the mark is currently displayed in the checkbox 74A, in S260 the CPU 13 cancels this display and resets the draft flag. On the other hand, if the mark is not currently displayed in the checkbox 74A, then the CPU 13 displays the mark in the checkbox 74A and sets the draft flag. Accordingly, the CPU 13 can reference a state of the draft flag when determining whether a watermark (DRAFT) attached to an image has the color restriction attribute.

After toggling the display of the mark in the checkbox 74A and reversing the setting of the draft flag in S260, the CPU 13 again repeatedly executes the process in S120-S180 until one of the input objects 71-77 has been clicked.

Further, if the CPU 13 determines that the checkbox 74A of the Monochrome When Including Watermark "DRAFT" 74 was not clicked (S150: NO), then the CPU 13 determines in S160 whether the checkbox 75A of the Apply to Administrator 75 was clicked.

If the checkbox 75A was clicked (S160: YES), then in S270 the CPU 13 toggles the display of the mark in the checkbox 75A and reverses a setting of an administrator flag indicating whether the color restriction printing function applies to the administrator, i.e., whether the color restriction printing function applies to all users including the administrator.

Specifically, if the mark is currently displayed in the checkbox 75A, then in S270 the CPU 13 cancels this display and resets the administrator flag. On the other hand, if the mark is not currently displayed in the checkbox 75A, then the CPU 13 displays the mark in the checkbox 75A and sets the administrator flag.

After toggling the display of the mark in the checkbox 75A and reversing the setting for the administrator flag in S270, the CPU 13 again repeatedly executes the process in S120-S180 until one of the input objects 71-77 has been clicked.

Further, if the CPU 13 determines that the checkbox 75A of the Apply to Administrator 75 was not clicked (S160: NO), then the CPU 13 determines in S170 whether the OK button 76 was clicked. If the OK button 76 was clicked (S170: YES), then in S280 the CPU 13 updates the flag settings stored in the HDD 16 to reflect any modifications made in the process for configuring the color restriction printing function and subsequently ends the process. As will be described later with reference to FIG. 6, a printing process is executed based on the most recent contents stored in the HDD 16.

Further, if the CPU 13 determines that the OK button 76 was not clicked (S170: NO), then the CPU 13 determines in S180 whether the Cancel button 77 was clicked. If the Cancel button 77 was clicked (S180: YES), then in S290 the CPU 13 deletes (discards) any modifications to the flag settings made in the process for configuring the color restriction printing function, and subsequently ends the process.

Hence, when the user ends the process for configuring the color restriction printing function by clicking on the Cancel button 77, the printing process described later (see FIG. 6) does not incorporate the results of modifications to flag settings made in this process, but incorporates the state of the flag settings (contents of settings in the checkboxes 71A-75A) stored in the HDD 16 before the process for configuring the color restriction printing function was started, i.e., before the color restriction setup dialog box 70 was displayed.

5.2. Printing Process

Next, operations of a program (printing process) executed by the PC 10 according to the present embodiment will be described. This program is executed when the user selects (clicks) the OK button 60 in the printing setup window 30 (see FIG. 3).

Figure 6:
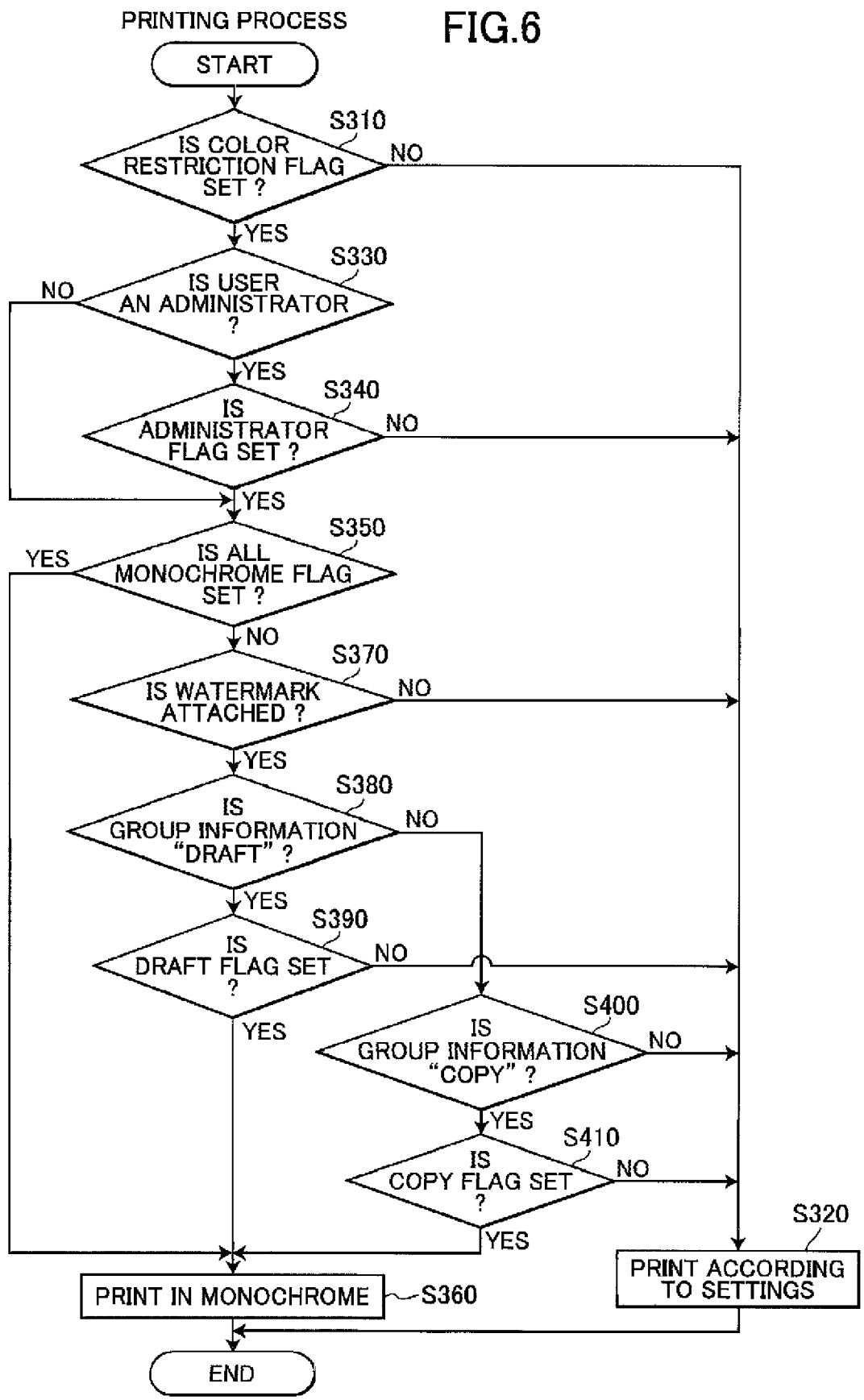
FIG. 6 is a flowchart illustrating steps in a printing process performed in the printing system of the embodiment.

FIG. 6 is a flowchart illustrating steps in the printing process. At the beginning of the printing process, the CPU 13 reads the settings of flags stored in the HDD 16 and settings of the printing setup window 30 stored in the RAM 15. In S310 of the printing process, the CPU 13 determines whether the color restriction flag has been set.

If the color restriction flag is not set (S310: NO), then in S320 the CPU 13 prints the images according to the printing mode specified by the user, and subsequently ends the printing process.

In other words, the CPU 13 prints the images in monochrome in S320 if the user has specified the monochrome printing mode or prints the images in color if the user has specified the color printing mode.

However, if the color restriction flag has been set (S310: YES), then in S330 the CPU 13 determines whether the user of the printer 20 is the administrator, based on the login name inputted when the user logged into the PC 10.

If the CPU 13 determines that the user of the printer 20 is an administrator (S330: YES), then in S340 the CPU 13 determines whether the administrator flag is set. If the administrator flag is not set (S340: NO), it means that the "Apply to Administrator" check box 75A is not checked, and then the CPU 13 again advances to S320. However, if the administrator flag is set (S340: YES), then in S350 the CPU 13 determines whether the all monochrome flag is set.

On the other hand, if the CPU 13 determines in S330 that the user of the printer 20 is not the administrator (S330: NO), then the CPU 13 skips to S350. If the CPU 13 determines in S350 that the all monochrome flag is set (S350: YES), then in S360 the CPU 13 prints the image in the monochrome printing mode, and subsequently ends the printing process.

Further, when the CPU 13 determines that the all monochrome flag is not set (S350: NO), the CPU 13 determines in S370 whether a watermark has been added to the image to be printed. If the watermark has not been added to the image (S370: NO), then the CPU 13 prints the image in S320 according to the printing mode set by the user, and subsequently ends the printing process.

However, if the watermark has been added to the image to be printed (S370: YES), then the CPU 13 determines in S380 whether the specified watermark is relevant to the group information "DRAFT".

If the specified watermark is relevant to the group information "DRAFT" (S380: YES), then in S390 the CPU 13 determines whether the image should be printed in the monochrome printing mode based on whether the draft flag has been set.

In other words, if the CPU 13 determines in S390 that the draft flag is set (S390: YES), then in S360 the CPU 13 prints the image in the monochrome printing mode in order to enforce a color restriction when the watermark applied to the image is relevant to the group information "DRAFT".

However, if the draft flag has not been set (S390: NO), then in S320 the CPU 13 prints the image according to the printing mode specified by the user.

Further, if the CPU 13 determines in S380 that the watermark is not relevant to the group information "DRAFT" (S380: NO), then in S400 the CPU 13 determines whether the watermark added to the image is relevant to the group information "COPY".

If the watermark is not relevant to the group information "COPY" (S400: NO), then in S320 the CPU 13 prints the image according to the printing mode specified by the user and subsequently ends the printing process.

However, if the watermark is relevant to the group information "COPY" (S400: YES), then the CPU 13 determines in S410 whether to print the image in the monochrome printing mode based on whether the copy flag has been set.

Specifically, if the CPU 13 determines in S410 that the copy flag is set (S410: YES), then in S360 the CPU 13 prints the image in the monochrome printing mode in order to enforce the color restriction when the watermark added to the image is relevant to the group information "COPY".

However, if the copy flag has not been set (S410: NO), then in S320 the CPU 13 prints the image in the printing mode specified by the user.

6. Features of the Printing System According to the Present Embodiment

The printing system according to the present embodiment enables the administrator to set a type of watermark having the color restriction attribute. Specifically, by clicking the checkbox 73A or the checkbox 74A in the color restriction setup dialog box 70, the administrator can set the type of watermark for which color restriction is to be enforced. Therefore, the printing system can restrict color printing (perform monochrome printing) for images having the specified watermark, or for all images (S360).

By printing images in the monochrome printing mode when the watermark having the color restriction attribute is added to the image in this way, the printing system effectively restricts color printing. As a result, the printing system can reduce overall costs of printing. In the present embodiment, the printing system easily determines whether the watermark has the color restriction attribute by referencing the flag settings.

The printing system of the embodiment can execute monochrome printing (S360) for all images (S350: YES), images having the watermark with the character string "COPY" (S410: YES), or images having the watermark with the character string "DRAFT" (S390: YES).

Therefore, the printing system can print jobs that have less need to be printed in color, such as "COPY" or "DRAFT" jobs, in the monochrome printing mode based on an administrator settings for the color restriction printing function, thereby effectively restricting color printing.

The administrator can also modify settings for the color restriction as desired by clicking the checkbox 73A of the Monochrome When Including Watermark "COPY" 73 or the checkbox 74A of the Monochrome When Including Watermark "DRAFT" 74 (see FIG. 4), thereby configuring the printing system to perform the color restriction according to the desire of the administrator.

Further, in the present embodiment the printing system prints images in S320 according to the printing mode specified by the user, without color restriction, if the mark is not displayed in the checkbox 71A of the Color Restriction Mode 71 (see FIG. 4; S310: NO), thereby enabling the color restriction based on the desire of the administrator.

Further, if the mark is not displayed in the checkbox 75A of the Apply to Administrator 75 in the present embodiment (S340: NO), then in S320 the printing system prints images according to the printing mode specified by the user (administrator), disabling the color restriction printing function for the administrator, making the system more user-friendly for the administrator.

Next, a method for registering new watermarks will be described. First, the user clicks the watermark setting button 53 of the expanded function setup window 50, at which time a watermark setting dialog box 80 shown in FIG. 7 is displayed on the display unit 11.

Figure 7:
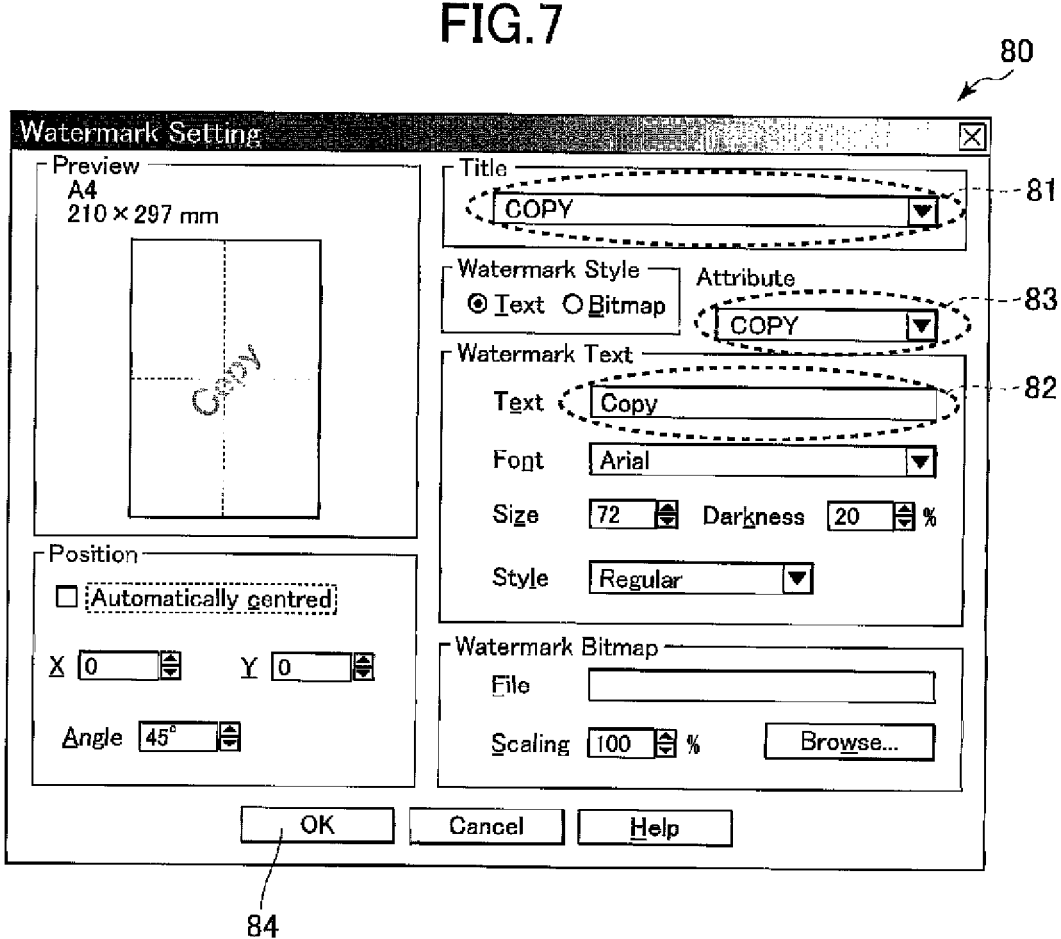
FIG. 7 is an explanatory diagram showing a watermark setting dialog box in the printing system according to the embodiment.
Figure 8:
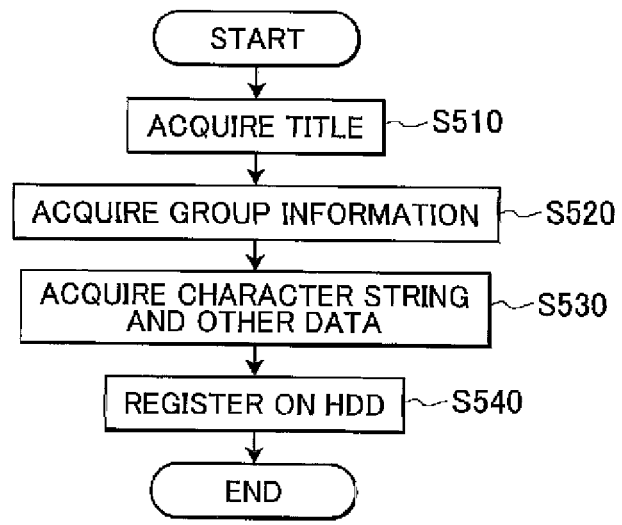
FIG. 8 is a flowchart illustrating steps in a watermark registering process performed on the printing system according to the embodiment.

FIG. 7 is a screenshot illustrating a window for setting information related to watermark (watermark setting dialog box), such as the watermark and group information for the watermark. FIG. 8 is a flowchart illustrating steps in the watermark registering process.

The watermark setting dialog box 80 is configured of a plurality of input objects including a title selection part 81 for selecting a title for the watermark, a character string input part 82 for inputting a character string for the watermark to be printed together with an image, a group information selecting part 83 for selecting the group information for the watermark, and an OK button 84. In the title selection part 81, the user can select the title from among a plurality of candidates ("CONFIDENTIAL," "COPY," and "DRAFT"). The user can also input a desired character string in the character string input part S2. In place of the character string, the user can also specify a type of imager such as bitmap data. In the group data selecting part 83, the user can select the group information from among a plurality of candidates ("COPY" and "DRAFT").

In the example of FIG. 7, "COPY" has been selected as the title, "COPY" has been selected as the group information, and "Copy" has been inputted as the character string. If the user clicks the OK button 84 at this time, this data inputted in the watermark setting dialog box 80 is temporarily stored in the RAM 15.

Next, the watermark registering process will be described with reference to FIG. 8. In S510 of the process, the CPU 13 acquires the title selected in the title selection part 81 ("COPY"). In S520 the CPU 13 acquires the group information selected in the group information selecting part 83 ("COPY"). In S530 the CPU 13 acquires the character string ("Copy") inputted in the character string input part 82 and other data. In S540 the CPU 13 registers the data acquired in S510-S530 in the watermark table of the HDD 16, as shown in FIG. 9. Since the watermark having the title "COPY" is already recorded in the table, the newly watermark title is recorded as "COPY2" with the ID 4, as shown in FIG. 9.

Contents set in the watermark setting dialog box 80, as described above, is stored (registered) in the HDD 16 in association with one another and the CPU 13 ends the watermark recording process. Subsequently, the newly recorded title "COPY2" is displayed in the watermark selection window 52 of the expanded function setup window 50, enabling the user to select this title when printing. If the user selects (clicks) the OK button 60 in the printing setup window 30 at this time, the CPU 13 prints an image according to the contents set in the basic setup window 40 and expanded function setup window 50, i.e., the printing setup window 30.

As described above, with the watermark setting dialog box 80 the user can register a new watermark and is assign group information to the new watermark. Hence, the user can apply the color restriction to a user-defined watermark, rather than being limited by the watermarks already stored in the HDD 16, thereby improving the function for color restriction.

Further, new watermarks registered by the user can be used thereafter in subsequent processes, improving the user-friendliness of the printing system. Further, since the user can register a newly inputted watermark in association with the group information, this configuration facilitates the PC 10 in performing a watermark determining process (S380 and S400 in FIG. 6).

(Second Embodiment)

The watermark setting dialog box 80 in the first embodiment is configured so that the user selects (inputs) the group information for the watermark. However, when the user inputs a character string for the watermark in the second embodiment, the printing system is configured to detect (infer) the group information for the watermark based on the character string.

FIG. 10 is a control flowchart illustrating a process executed when a character string is inputted into the character string input part 82 of the watermark setting dialog box 80 (see FIG. 7). In S610 at the beginning of the control process, the CPU 13 compares the character string inputted into the character string input part 82 and character strings related to "COPY".

Here, "character strings related to 'COPY'" is a character string signifying "COPY," such as "COPY," "Copy," "copy," and "Duplicated." A plurality of such character strings are provided in the program.

In S620 the CPU 13 determines whether the character string inputted into the character string input part 82 is one of the character strings related to "COPY" based on the results of comparison in S610. If the character string is related to "COPY" (S620; YES), then in S630 the CPU 13 displays a confirmation dialog box (not shown) on the display unit 11 asking the user whether to set the group information for the character string (watermark) inputted into the character string input part 82 to "COPY."

In S640 the CPU 13 determines whether the user has inputted an affiliation/permission command permitting the group information for the character string to be set to "COPY."

In the second embodiment, the confirmation dialog box is provided with an OK button and a Cancel button. The CPU 13 determines that an affiliation command was inputted when the OK button was selected (clicked) and determines that the affiliation command was not inputted when the Cancel button was selected (clicked). This is also true for the process of S690 described later.

If the affiliation command was inputted (S640: YES), then in S650 the CPU 13 sets "COPY" in the group information selecting part 83 as the group information for the character string (watermark) inputted in the character string input part 82. In S660 the CPU 13 compares the character string inputted into the character string input part 82 with character strings related to "DRAFT".

Here, "character strings related to 'DRAFT'" are character strings signifying "DRAFT," such as "DRAFT," "Draft," "draft," and "Rough."

On the other hand, if the affiliation command was not inputted (S640: NO), then the CPU 13 skips to S660 without setting the group information for the character string inputted into the character string input part 82 and compares the character string inputted into the character string input part 82 with the character strings related to "DRAFT".

Further, if the character string inputted into the character string input part 82 is not one of the character strings related to "COPY" (S620: NO), then the CPU 13 skips to S660 and compares the character string with character strings related to "DRAFT."

In S670 the CPU 13 determines whether the character string inputted into the character string input part 82 is included in the character strings related to "DRAFT" based on the results of comparison in S660. If the character string is not one of the character strings related to "DRAFT" (S670: NO), then the CPU 13 ends the control process.

However, if the character string is included in those related to "DRAFT" (S670: YES), then in S680 the CPU 13 displays a confirmation dialog box (not shown) on the display unit 11 asking the user whether to set "DRAFT" as the group information for the character string (watermark) inputted into the character string input part 82.

In S690 the CPU 13 determines whether the user has inputted an affiliation command permitting the group information for the character string inputted in the character string input part 82 to be set to "DRAFT." If the affiliation command was not inputted (S690. NO), then the CPU 13 ends the control process.

However, if the affiliation command was inputted (S690: YES), then in S700 the CPU 13 sets "DRAFT" in the group information selecting part 83 as the group information for the character (watermark) string inputted into the character string input part 82, and subsequently ends the control process.

As described above, the CPU 13 detects the group information for the watermark based on the character string for the watermark inputted into the character string input part 82 in the second embodiment, thereby eliminating the need for the user to input the group information for the watermark.

While the invention has been described in detail with reference to specific embodiments thereof, it would be apparent to those skilled in the art that many modifications and variations may be made therein without departing from the spirit of the invention, the scope of which is defined by the attached claims. For example, while "watermark" in the above-described embodiments signifies a transparent image superimposed over the image to be printed, "watermark" may instead simply signify an additional image printed on the recording paper together with the image (primary image) to be printed, such as a header or footer.

Further, while the color restriction printing function is configured on the PC 10 in the above-described embodiments, this function may be configured on the printer 20 instead.

Further, while the color restriction attribute is determined based on the group information for the watermarks stored in the HDD 16 in the embodiments described above, the color restriction attribute may instead by determined based on the character strings for the watermarks.

In the embodiments described above, users are classified as the administrator and other users, and the administrator can be given privileges to print in color when other users are not allowed to perform color printing. The administrator is not necessarily a user registered as the OS administrator. For example, the printer driver may be provided with a database for managing administrative privileges for each user, and administrative privileges may be given to specific users based on this data.

The printer in the above-described embodiments may be an inkjet printer that forms images on a recording medium, such as paper, by ejecting ink droplets on the recording medium, or may be a laser printer that forms images by scanning a laser beam over a photosensitive member.

Further, any method may be used for converting images to be printed from color to monochrome when implementing the color restriction printing function. For example, the PC 10 may convert the image from color to monochrome, while the printer 20 combines the image to be printed with the watermark, or the printer 20 may also convert the image from color to monochrome. Alternatively, the PC 10 may both convert the image to monochrome and combine the converted image with the watermark.

What is claimed is:

1. A printing system comprising:
    a printing unit that is configured to print a primary image and a watermark on a recording medium and that is capable of switching between a multicolor printing mode and a monochrome printing mode, one of the multicolor printing mode and the monochrome printing mode being set for the primary image;
    a storing unit that stores a plurality of watermarks and a plurality of group information each being an identifier for sorting the plurality of watermarks into groups;
    a watermark selecting unit that accepts a user's input selecting a watermark from the plurality of watermarks;
    at least one processor; and
    memory storing computer-readable instructions that, when executed by the at least one processor, cause the printing system to provide:
        a determining unit that determines, based on the watermark selected by the watermark selecting unit and the group information corresponding to the watermark, whether the watermark has an attribute indicating the monochrome printing mode; and
        a color restricting unit that, even if the multicolor printing mode is set for the primary image, controls the printing unit to print the primary image and the watermark in the monochrome printing mode if the determining unit determines that the watermark has the attribute indicating the monochrome printing mode.

2. A printing controller connected to and controlling a printer for printing a primary image and a watermark on a recording medium, the printing controller being capable of switching the printer between a multicolor printing mode and a monochrome printing mode, one of the multicolor printing mode and the monochrome printing mode being set for the primary image, the printing controller comprising:

a storing unit that stores a plurality of watermarks and a plurality of group information each being an identifier for sorting the plurality of watermarks into groups;
a watermark selecting unit that accepts a user's input selecting a watermark from the plurality of watermarks;
at least one processor; and
memory storing computer-readable instructions that, when executed by the at least one processor, cause the printing controller to provide:
 a determining unit that determines, based on the watermark selected by the watermark selecting unit and the group information corresponding to the watermark, whether the watermark has an attribute indicating the monochrome printing mode; and
 a color restricting unit that, even if the multicolor printing mode is set for the primary image, controls the printer to print the primary image and the watermark in the monochrome printing mode if the determining unit determines that the watermark has the attribute indicating the monochrome printing mode.

3. The printing controller according to claim 2, wherein the determining unit determines that the group information corresponding to the watermark has the attribute indicating the monochrome printing mode if the watermark has a character string or a watermark image signifying "copy".

4. The printing controller according to claim 2, wherein the determining unit determines that the group information corresponding to the watermark has the attribute indicating the monochrome printing mode if the watermark has a character string or a watermark image signifying "draft".

5. The printing controller according to claim 2, wherein the memory stores additional computer-readable instructions that, when executed, further cause the printing controller to provide a watermark acquiring unit that is configured to accept a user's input operation, the watermark acquiring unit being configured to receive a watermark and group information inputted by the user.

6. The printing controller according to claim 5, wherein the memory stores additional computer-readable instructions that, when executed, further cause the printing controller to provide a watermark registering unit that is configured to register the user's input watermark and the user's input group information in association with each other.

7. The printing controller according to claim 2, wherein the memory stores additional computer-readable instructions that, when executed, further cause the printing controller to provide:
 a watermark input unit that is capable of accepting a user's input watermark having a character string; and
 an attribute detecting unit that is configured to detect group information of the user's input watermark based on the character string constituting the user's input watermark.

8. The printing controller according to claim 2, wherein the memory stores additional computer-readable instructions that, when executed, further cause the printing controller to provide an attribute setting unit that is configured to set group information of the watermark to have an attribute indicating the monochrome printing mode.

9. The printing controller according to claim 2, wherein the memory stores additional computer-readable instructions that, when executed, further cause the printing controller to provide an operation inhibiting unit that is configured to inhibit operations of the color restricting unit.

10. The printing controller according to claim 2, further comprising an instruction input unit that is capable of inputting an instruction to execute a printing operation by a user, wherein the memory stores additional computer-readable instructions that, when executed, further cause the printing controller to provide:
 a specific user determining unit that is configured to determine whether a user who has inputted the instruction is a specific user; and
 an inhibition setting unit that is configured to inhibit operations of the color restricting unit if the specific user determining unit determines that the user is the specific user.

11. A non-transitory computer-readable storage medium storing computer-readable instructions for instructing a printing system including a printing unit capable of printing a primary image and a watermark on a recording medium and switching between a multicolor printing mode and a monochrome printing mode, one of the multicolor printing mode and the monochrome printing mode being set for the primary image, wherein the computer-readable instructions, when executed by at least one computing device, cause the at least one computing device to:
 store a plurality of watermarks and a plurality of group information each being an identifier for sorting the plurality of watermarks into groups;
 accept a user's input selecting a watermark from the plurality of watermarks;
 determine, based on the watermark selected and the group information corresponding to the watermark, whether the watermark has an attribute indicating the monochrome printing mode; and
 control the printing unit to print the primary image and the watermark in the monochrome printing mode, even if the multicolor printing mode is set for the primary image, if it is determined that the watermark has the attribute indicating the monochrome printing mode.

12. The non-transitory computer-readable storage medium according to claim 11, wherein determining whether the watermark has an attribute indicating the monochrome printing mode includes determining that the group information corresponding to the watermark has the attribute indicating the monochrome printing mode if the watermark has a character string or watermark image signifying "copy".

13. The non-transitory computer-readable storage medium according to claim 11, wherein determining whether the watermark has an attribute indicating the monochrome printing mode includes determining that the group information corresponding to the watermark has the attribute indicating the monochrome printing mode if the watermark has a character string or watermark image signifying "draft".

14. The non-transitory computer-readable storage medium according to claim 11, having additional computer-readable instructions stored thereon that, when executed by the at least one computing device, further cause the at least one computing device to accept a user's input operation and receive a watermark and group information inputted by the user.

15. The non-transitory computer-readable storage medium according to claim 11, having additional computer-readable instructions stored thereon that, when executed by the at least one computing device, further cause the at least one computing device to:
 accept a user's input watermark having a character string; and
 detect group information of the user's input watermark based on the character string constituting the user's input watermark.

16. A print controlling method for a printing system including a printing unit 1 capable of printing a primary image and a watermark on a recording medium and switching between a multicolor printing mode and a monochrome printing mode, one of the multicolor printing mode and the monochrome printing mode being set for the primary image, the print controlling method comprising:

storing, by a computing device, a plurality of watermarks and a plurality of group information each being an identifier for sorting the plurality of watermarks into groups;

accepting, by the computing device, a user's input selecting a watermark from the plurality of watermarks;

determining, by the computing device, whether the watermark has an attribute indicating the monochrome printing mode based on the watermark selected and the group information corresponding to the selected watermark; and controlling, by the computing device, the printing unit to print the primary image and the watermark in the monochrome printing mode, even if the multicolor printing mode is set for the primary image, if the determining determines that the watermark has the attribute indicating the monochrome printing mode.

\* \* \* \* \*

UNITED STATES PATENT AND TRADEMARK OFFICE
CERTIFICATE OF CORRECTION

PATENT NO. : 8,542,400 B2
APPLICATION NO. : 11/966178
DATED : September 24, 2013
INVENTOR(S) : Masatoshi Kadota Page 1 of 1

It is certified that error appears in the above-identified patent and that said Letters Patent is hereby corrected as shown below:

On the Title Page, Item (73) under Assignee:
Please replace "Brother Kogy Kabushiki Kaisha" with --Brother Kogyo Kabushiki Kaisha--

Signed and Sealed this
Twelfth Day of August, 2014

Michelle K. Lee
*Deputy Director of the United States Patent and Trademark Office*